United States Patent
Kamakura et al.

[15] 3,660,979
[45] May 9, 1972

[54] METHOD AND DEVICE FOR DAMPING FLOW PULSATIONS IN A HYDRAULIC SYSTEM

[72] Inventors: Satoru Kamakura; Yukio Watanabe, both of Tokyo, Japan

[73] Assignee: Nissan Motor Company, Limited, Yokohama City, Japan

[22] Filed: Apr. 1, 1970

[21] Appl. No.: 24,481

[52] U.S. Cl. ..................................60/52, 137/207, 138/26, 417/312, 137/14
[51] Int. Cl. ..........................................F16l 55/04
[58] Field of Search ..............137/207, 14; 138/26; 417/312; 60/52 S

[56] References Cited

UNITED STATES PATENTS 2,973,013  2/1961  Myers ...............................137/625.62
2,795,374  6/1957  Isakoff ..................................138/26 X Primary Examiner—Alan Cohan
Attorney—McCarthy, Depaoli, O'Brien & Price

[57] ABSTRACT

A method and device for damping flow pulsations in a liquid-phase flow supplied under pressure from a conventional hydraulic pump or the like, which method comprises dividing the supplied pulsating flow into two separate flow components, causing the flow components to impinge upon each other in an enclosure so as to cancel the pulsating energy in the two flow components, and withdrawing the pulsation-free pressurized flow out of the enclosure, whereby a pressurized flow cleared of pulsations can be supplied to a hydraulic system such as an automotive power steering system.

4 Claims, 4 Drawing Figures

PATENTED MAY 9 1972

INVENTORS
SATORU KAMAKURA
BY YUKIO WATANABE
ATTORNEYS

METHOD AND DEVICE FOR DAMPING FLOW PULSATIONS IN A HYDRAULIC SYSTEM

This invention relates to method and device for damping flow pulsations in a working fluid flow in piping systems.

Flow pulsations in piping systems such as for a hydraulic steering system of a motor vehicle are known to result from the presence of reciprocating machinery (compressors or pumps) in the system. Such pulsations generally adversely affects the performance of the hydraulic system and can cause vibration and ultimately equipment failure.

Various expedients have thus far been proposed for the damping of the flow pulsations, involving the use of a filter, orifice, gas-filled surge-chamber, or combination of any of these. Where any of such expedients is put into practice, it is almost impossible to completely eliminate the flow pulsations partly because of the limited frequency, say about 1 to 100 cycles per second, of the pulsations produced in the hydraulic pump or compressor and partly because of the high viscosity of the liquid used. What is more important, the provision of the flow pulsation damping devices of known type often results in significant depletion of the pressure of the liquid and, hence, has failed to find wide applications for practical purposes.

It is, therefore, an object of the invention to provide an improved method for damping pulsations in a working fluid flow under pressure without depletion of the pressure of the flow.

Another object is to provide a device which is adapted to damp the flow pulsations in a method proposed by the invention.

In order to accomplish these objects, the invention proposes, as novel, to divide the pulsating flow supplied under pressure from a hydraulic pump into two separate flow components, cause the two separate flow components to impinge upon each other in a face-to-face relationship in an enclosure thereby to cancel the pulsating energy in the flow components, and withdraw the thus substantially pulsation-free flow out of the enclosure. The flow pulsations can be in this manner damped without depletion of the initial pressure therein.

Figure 1:
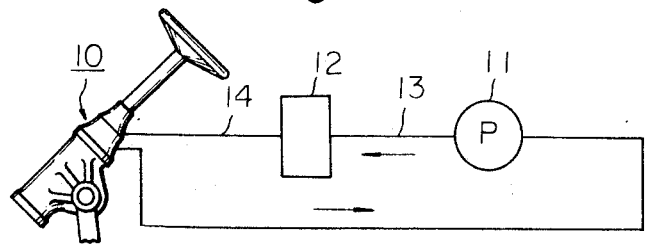
FIG. 1 is a schematic view of a power steering system incorporating a device for damping the flow pulsations according to this invention.

Referring to FIG. 1, the flow pulsation damping device according to the invention is shown as applied to, by way of example, a power steering system of a motor vehicle, although the same may be applied to any other hydraulic systems using a pump or the like. The power steering system, which is generally designated by numeral 10, is operated by a piping system including a source 11 of fluid pressure, which source is actually a pump of suitable type.

According to the invention, a device 12 is provided between the power steering system 10 and pump 11 so as to damp the pulsations in the pressure of the working fluid flow from the pump 11. The device 12 is connected on its upstream side with the pump 11 through an inlet conduit 13 and on its downstream side with the steering system 10 through an outlet conduit 14.

Figure 2:
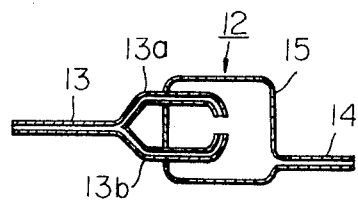
FIG. 2 is a schematic view showing, on an enlarged scale, the device for damping the flow pulsations of pressurized fluid as used in the system shown in FIG. 1.

The construction arrangement of the device 12 in a preferred form is shown in FIG. 2. As shown, the inlet conduit 13 leading from the pump 11 diverges into two separate inlet nozzles of the same length 13a and 13b which open into an enclosure 15 of the device 12. The nozzles 13a and 13b are oriented in a face-to-face relationship with each other at a suitable spacing inbetween.

The inlet nozzles 13a and 13b being thus arranged, the working fluid flow under pressure fed from the pump 11 is divided into two substantially equal components in the nozzles 13a and 13b and, as the two flows spurts into the enclosure 15, they are caused to impinge upon each other violently. The pulsations in the two opposite flows are interfered with each other so that the pulsating energy component existing in the supplied flow is substantially cancelled. The flow is then withdrawn into the output conduit 14, so that a substantially pulsation-free pressurized flow is supplied to the steering system without depletion of the initial pressure.

Figure 3:
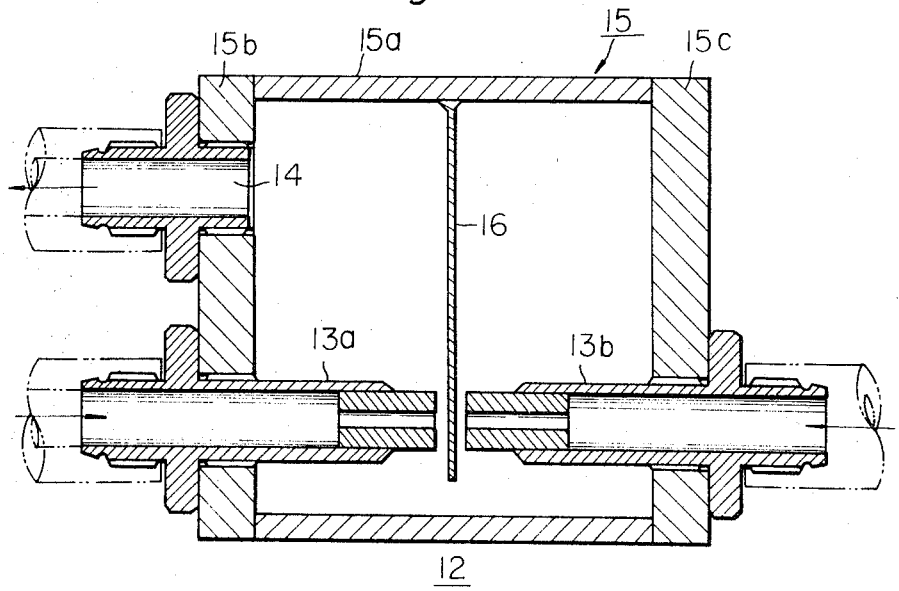
FIG. 3 is a sectional view of a modification of the device shown in FIG. 2.

FIG. 3 illustrates a more practical embodiment of the invention realizing the construction concept of the device of FIG. 2, wherein like reference numerals represent corresponding parts in both figures.

The device 12 as shown has an enclosure 15 made up of an open-ended cylindrical housing 15a which is closed at both ends by side walls 15b and 15c. Separate inlet nozzles 13a and 13b leading from the host conduit 13 (FIG. 2) are opened into the enclosure 15 through the side walls 15b and 15c and oriented in a face-to-face relationship with each other at a suitable spacing inbetween. Designated by numeral 14 is an output conduit which leads to an ultimate hydraulic system which has been shown in FIG. 2 as an automotive power steering system by way of example. The operation of the device 12 thus constructed will be self-explanatory from the discussion given on the simplified embodiment shown in FIG. 2 and as such detailed description thereof may be herein removed.

Different from the construction arrangement shown in FIG. 2, the device 12 of FIG. 3 is illustrated as having buffer means 16 which is secured to the inner wall surface of the cylindrical casing 15a and which terminates between the leading ends of the nozzles 13a and 13b. The buffer means 16 will serve to facilitate cancellation of the pulsating energy components in the two flows gushing out of the nozzles 13a and 13b.

Figure 4:
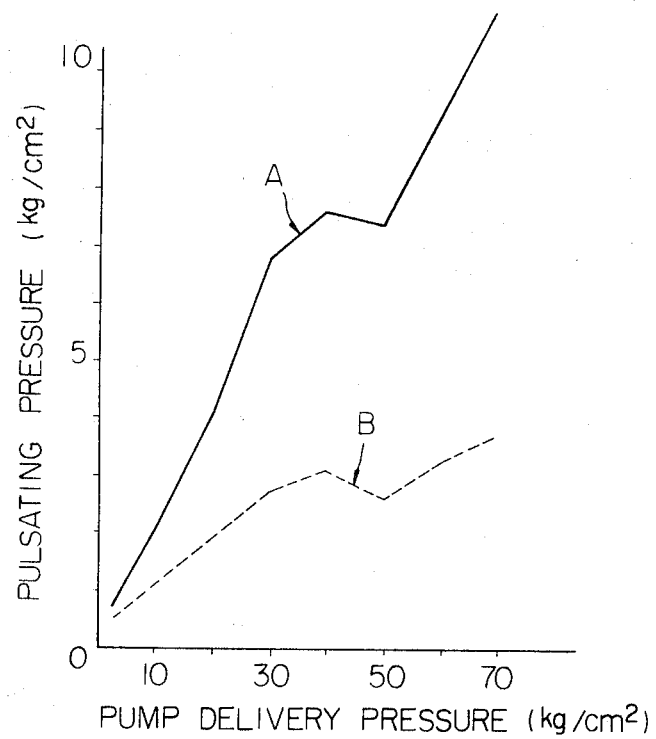
FIG. 4 is a graph showing the relationships between the pump delivery pressure and the pulsating pressure.

FIG. 4 shows a variation in the pulsating pressure measured when the discharge pressure of a hydraulic pump is varied with the pump displacement kept at 7l/min. The solid curve A shows a variation in the pulsating pressure of a flow delivered direct from the hydraulic pump, while the dashed curve B shows a variation in the pulsating pressure of a flow passed through the device of the invention. It will be apparent from these curves that the variation in the pressure pulsation can be reduced more than 50 percent with the device of the invention installed in the hydraulic system.

What is claimed is:

1. A method of damping pulsations produced in a working fluid circulating in a power steering hydraulic system by a hydraulic pump in the hydraulic system, comprising dividing the working fluid into two opposite flow components having pulsations of the same phase, causing the two opposite flow components to interfere with and offset the momentum of each other in an enclosure for cancelling the pulsations in the two opposite flow components, and withdrawing the thus substantially pulsation-free flow out of said enclosure.

2. In a power steering hydraulic system including a power steering for steering through boosted hydraulic pressure a steering wheel of a vehicle and a hydraulic pump for boosting a working fluid circulating in the hydraulic system to actuate the power steering, a device for damping pulsations in the working fluid comprising an enclosure communicating with said pump through an inlet conduit and with the power steering through an outlet conduit, said inlet conduit being divided into two separate nozzles of the same length opening into said enclosure and directed in a face-to-face relationship with each other at a suitable spacing inbetween, whereby two opposite flow components divided from the circulating working fluid by said two separate nozzles interfere with and offset the momentum of each other so that the pulsations of the same phase in the flow components are cancelled.

3. A device according to claim 2, further comprising buffer means secured to an inner wall surface of said enclosure and terminating equi-distantly between the outlets of said two separate nozzles for intercepting thereon the two opposite flow components.

4. A device according to claim 2, wherein said two opposite flow components impinge directly upon each other.

* * * * *